(12) United States Patent
Khare et al.

(10) Patent No.: US 7,124,252 B1
(45) Date of Patent: Oct. 17, 2006

(54) METHOD AND APPARATUS FOR PIPELINING ORDERED INPUT/OUTPUT TRANSACTIONS TO COHERENT MEMORY IN A DISTRIBUTED MEMORY, CACHE COHERENT, MULTI-PROCESSOR SYSTEM

(75) Inventors: Manoj Khare, Saratoga, CA (US); Akhilesh Kumar, Santa Clara, CA (US); Lily P. Looi, Portland, OR (US); Kenneth C. Creta, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 09/643,380

(22) Filed: Aug. 21, 2000

(51) Int. Cl.
*G06F 13/14* (2006.01)
(52) U.S. Cl. .......... 711/137; 710/39
(58) Field of Classification Search .......... 711/137, 711/141, 144–145, 147–148, 204, 210, 213, 711/169; 710/52, 55, 306, 309–310, 313, 710/5, 20, 39, 45; 712/207; 709/201, 213, 709/214
See application file for complete search history.

(56) References Cited

U.S. PATENT DOCUMENTS

| 6,049,847 | A | | 4/2000 | Vogt et al. ............. 710/130 |
| 6,058,461 | A | * | 5/2000 | Lewchuk et al. ........ 711/158 |
| 6,085,263 | A | | 7/2000 | Sharma et al. .......... 710/56 |
| 6,119,218 | A | * | 9/2000 | Arora et al. ............ 712/207 |
| 6,581,129 | B1 | * | 6/2003 | Buckland et al. ........ 710/306 |
| 6,718,454 | B1 | * | 4/2004 | Ebner et al. ............ 711/213 |

FOREIGN PATENT DOCUMENTS

EP 0847011 A2 10/1998

* cited by examiner

*Primary Examiner*—Denise Tran
(74) *Attorney, Agent, or Firm*—Cynthia Thomas Faatz

(57) ABSTRACT

An approach for pipelining ordered input/output transactions to coherent memory in a distributed memory, cache coherent, multi-processor system. A prefetch engine prefetches data from the distributed, coherent memory in response to a transaction from an input/output bus directed to the distributed, coherent memory. An input/output coherent cache buffer receives the prefetched data and is kept coherent with the distributed, coherent memory and with other caching agents in the system.

26 Claims, 5 Drawing Sheets

METHOD AND APPARATUS FOR PIPELINING ORDERED INPUT/OUTPUT TRANSACTIONS TO COHERENT MEMORY IN A DISTRIBUTED MEMORY, CACHE COHERENT, MULTI-PROCESSOR SYSTEM

BACKGROUND

1. Field

An embodiment of the present invention relates to the field of computer systems including distributed memory, and, more particularly, to an approach for pipelining input/output transactions in such systems.

2. Discussion of Related Art

Some input/output (I/O) buses, such as the Peripheral Component Interconnect (PCI) bus, have strict transaction ordering requirements. In a computer system in which there is only one path between such an I/O bus and memory, it is relatively easy to pipeline ordered requests from the I/O bus. This approach works well for systems with non-distributed memory architectures because of the existence of a single path between the I/O bus and memory.

For a system with a distributed memory architecture, however, where there are multiple paths between an I/O bus and memory, it has been common practice not to pipeline ordered requests from the I/O bus due to the complexity involved with maintaining transaction order over the multiple paths. Using a non-pipeline approach, an I/O bridge completes a first I/O bus request to memory before issuing the next I/O bus request. Such an approach can limit the achievable I/O throughput for transactions directed toward the distributed memory. This may result in overall system performance loss or require non-trivial software changes to avoid limiting the achievable I/O throughput.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method and apparatus for pipelining ordered input/output (I/O) transactions in a distributed memory, cache coherent system are described. In the following description, particular types of integrated circuits, systems and circuit configurations are described for purposes of illustration. It will be appreciated, however, that other embodiments are applicable to other types of integrated circuits, and to circuits and/or systems configured in another manner.

For one embodiment, a prefetch engine prefetches data from a distributed, coherent memory in response to a first transaction from an input/output bus directed to the distributed, coherent memory. A coherent cache buffer receives the prefetched data and is kept coherent with the distributed, coherent memory and with other coherent cache memories in the system.

Figure 1:
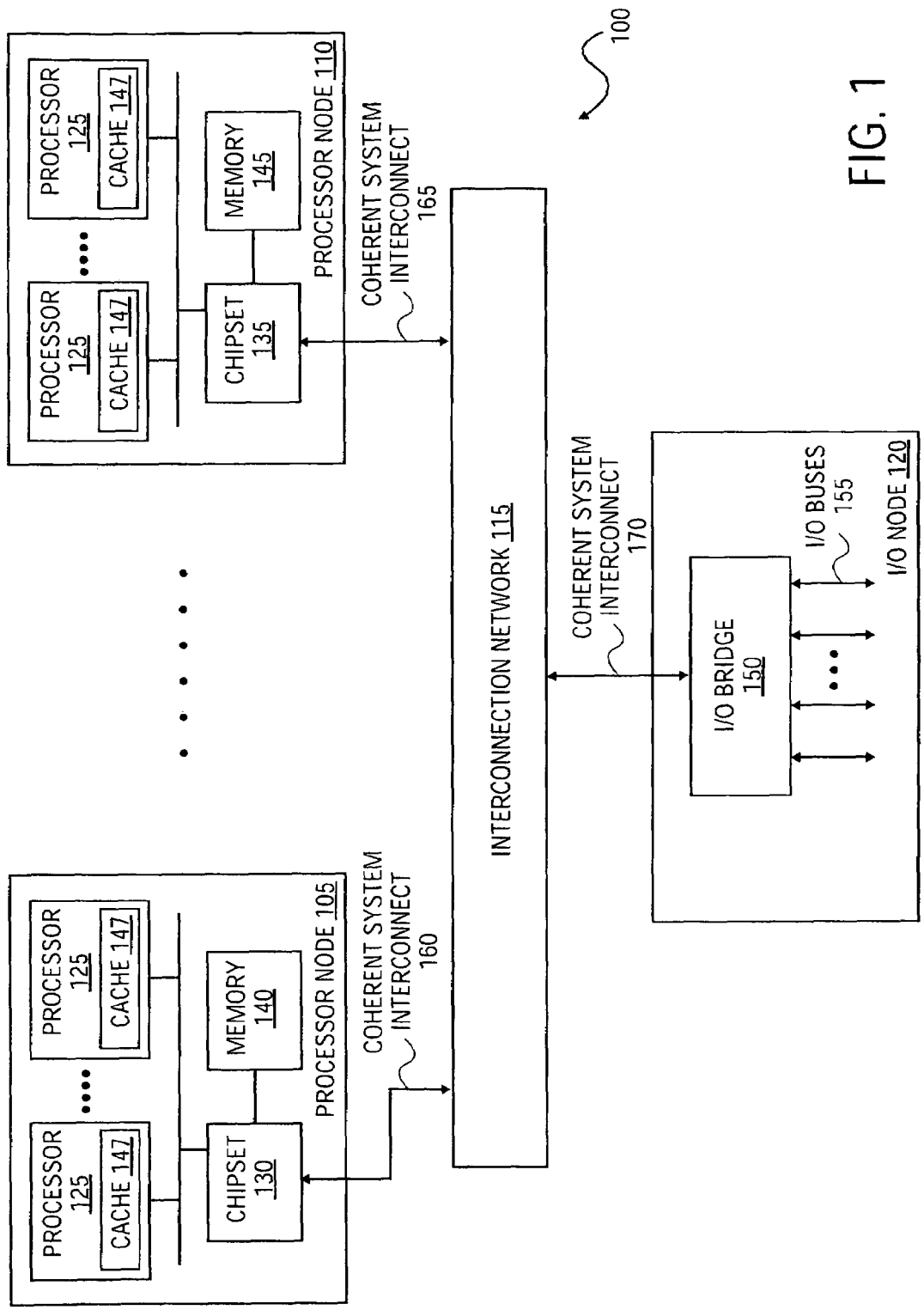
FIG. 1 is a block diagram of an exemplary distributed memory, cache coherent, multi-processor system in which ordered I/O transactions may be efficiently pipelined in accordance with one embodiment.

FIG. 1 is a block diagram showing an exemplary computer system 100 in which one embodiment of the invention may be advantageously used. The computer system 100 is a distributed memory, cache coherent, multi-processor system. The exemplary system 100 includes processing nodes 105 and 110 which may be included among a larger number of processing nodes. Also included in system 100 are an interconnection network 115 and an input/output (I/O) node 120.

Each of the processing nodes 105 and 110 includes one or more processors 125 to process instructions, one or more chipset components 130 and 135, respectively, and one or more local memories 140 and 145, respectively. The chipset component(s) 130 and 135 may perform functions such as, for example, memory control, multi-processing support and/or cache coherency maintenance for the respective node. One or more of the processors 125 may each include or be coupled to a cache memory 147. The cache memories 147 for one embodiment are coherent with each other and with the distributed, coherent memory implemented, in this example, by the memories 140 and 145.

The memories 140 and 145 of one embodiment operate together as a distributed, coherent main memory. Each of the memories 140 and 145 may be part of or a region of a larger memory that includes non-coherent regions as well. For one embodiment, coherency is maintained between the cache memories 147 and the memories 140 and 145 using the well-known MESI (modified, exclusive, shared or invalid) state protocol in conjunction with coherent system interconnect buses 160, 165 and/or 170. The coherent system interconnect buses 160, 165 and 170 communicate information between processing nodes 105 and 110 and the I/O node 120 via the interconnection network 115 in order to maintain coherency between the various memories 140, 145 and a coherent cache buffer in the I/O node 120 that is described in more detail below. For one embodiment, the coherent system interconnect buses 160, 165 and 170 are point-to-point interconnects without ordering restrictions in terms of communicating transactions between the processing nodes and the I/O node(s).

The interconnection network 115 may be provided to communicate messages between the I/O node 120 and the processing nodes such as the processing nodes 105 and 110. For one embodiment, the interconnection network 115 does not maintain ordering among the messages that are communicated between the I/O node 120 and one or more of the processing nodes 105 and 110.

The I/O node 120 includes an I/O bridge 150 to interface one or more I/O buses 155, such as, for example, a Peripheral Component Interconnect (PCI) bus, with the processing nodes 105 and 110. Further details of the I/O bridge 120 of one embodiment are described below in reference to FIG. 2.

For other embodiments, the system 100 may be configured in another manner. For example, the chipset and/or memories may be included within one or more of the processors 125 and/or the interconnection network 115 may not be included. Further, coherency of the memories may be maintained in accordance with a different protocol and/or using a different type of interconnection approach. Other types of system configurations in which there is more than one path between an I/O bus and memory are also within the scope of various embodiments.

Figure 2:
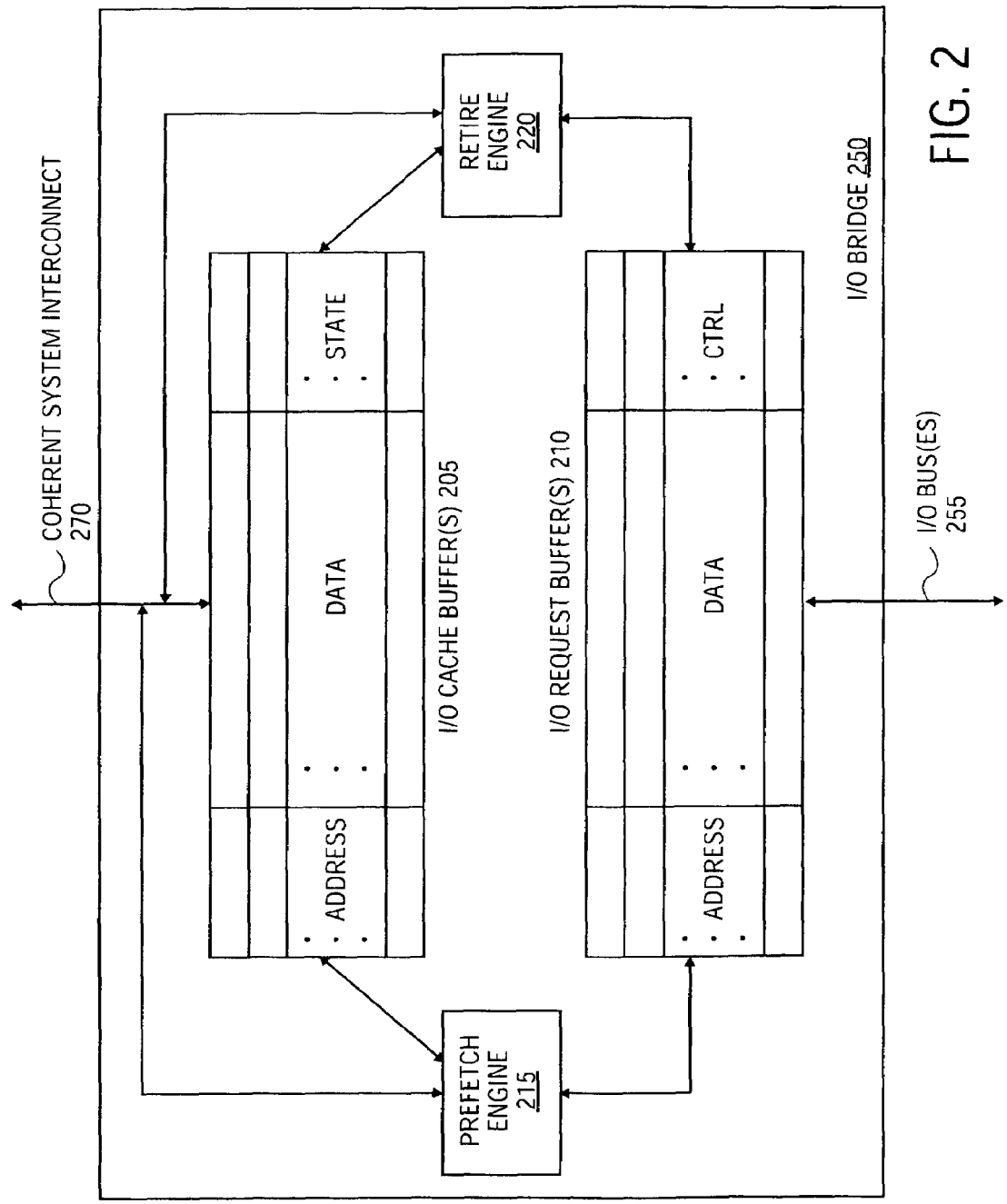
FIG. 2 is a block diagram of an input/output bridge of one embodiment that provides for efficient pipelining of ordered I/O transactions and which may be used in the system of FIG. 1.

FIG. 2 is a block diagram of an I/O bridge 250 that may be used for one embodiment to implement the I/O bridge 150 of FIG. 1. The I/O bridge 250 includes one or more I/O cache buffers 205, one or more I/O transaction request buffers 210, a prefetch engine 215 and a retire engine 220. Other circuitry, such as other I/O transaction processing, buffering and control circuitry (not shown) may also be included.

As described in more detail below, the cache buffer(s) 205 include address, data and state fields and are used to store prefetched data in response to one or more I/O transaction requests to facilitate pipelining of I/O transaction requests. The address field indicates the address at which data in the corresponding data field is stored in memory. The cache buffer(s) 205 of one embodiment are kept coherent with the other coherent memories of the system in which the I/O bridge 250 is included. For example, where the I/O bridge 250 is included in the system 100 of FIG. 1, the cache buffer(s) 205 are kept coherent with the distributed, coherent memories 140 and 145 and with the coherent cache memories 147. The state field of the I/O cache buffer(s) 205 is therefore used to indicate the coherency state (e.g. M (modified), E (exclusive), S (shared) or I (invalid) for one embodiment in which the MESI protocol is used) of the data in the corresponding data field.

The I/O transaction request buffer(s) 210 (also referred to herein as the I/O request buffers) are provided to store transaction requests that are directed to the distributed, coherent memory described in reference to FIG. 1 from one or more I/O buses 255. Such requests may alternately be referred to herein as inbound coherent requests or inbound coherent I/O requests.

For one embodiment, the I/O transaction request buffer(s) 210 may be used to store all I/O transaction requests, whether or not they are directed to coherent memory regions. I/O requests that are not directed to coherent memory are referred to herein as non-coherent transaction requests and may include, for example, I/O port accesses, configuration accesses, interrupts and/or special transactions, such as locks. Further, even some I/O transactions that are directed to coherent memory regions may be classified as non-coherent transactions. For example, memory accesses to coherent memory during a lock sequence may be classified as non-coherent transactions.

The desired sizes of the coherent cache buffer(s) and/or the input/output request buffer(s) may be determined by balancing the desired latency to memory and I/O throughput versus the available space for the buffer(s).

Also, for some embodiments, an I/O transaction request to write or read multiple lines of memory may be stored in the I/O transaction request buffer(s) 210 as a single transaction, but processed by the prefetch and retire engines as multiple, single line transactions at memory line boundaries. For such an embodiment, the processing of each of these single line transactions is in accordance with the approach described below for single, single line transactions.

The I/O transaction request buffer(s) 210 of one embodiment include address, data and control fields. The address field indicates an address associated with the request such as a memory address to be accessed. The data field provides corresponding data to be written to memory on a write request or a place for data returned on a read request, and the control field may be used to indicate relative instruction ordering information, request type and/or additional information related to the I/O transaction request.

Where the I/O request buffer 210 stores both coherent and non-coherent I/O transaction requests from the I/O buses 255, the type of transaction may be determined by the address associated with the transaction, the request type and/or control information in the control field.

For one embodiment, the I/O bridge 250 includes a separate I/O request buffer similar to the I/O request buffer 210 for each different I/O bus 255 coupled to the I/O bridge 250. For another embodiment, a single I/O request buffer 210 is provided to temporarily store I/O transaction requests received from all I/O buses 255 coupled to the I/O bridge 250. For this embodiment, the control field of the I/O transaction request buffer 210 may also indicate the bus from which the transaction was received. For an alternative embodiment, the I/O bridge 250 may include a different number of I/O transaction request buffers similar to the I/O transaction request buffer(s) 210, wherein one or more of the buffers is shared by multiple I/O buses 255.

Similarly, the cache buffer(s) 205 may include multiple cache buffers or a single cache buffer.

The prefetch engine 215 and the retire engine 220 may be implemented using two separate circuit blocks or they may be combined to provide the functionality described below.

In operation, inbound I/O transaction requests from one or more of the I/O buses 255 are temporarily stored in the I/O transaction request buffer 210. For one embodiment, the I/O transaction request buffer 210 is implemented as a first-in-first-out (FIFO) buffer such that incoming transactions are stored in the buffer in the order in which they were received from the I/O bus(es) 255 and transaction ordering does not need to be otherwise indicated. For another embodiment, relative transaction order may be indicated in the control field, for example.

The prefetch engine 215 then operates to enable pipelining of the transaction requests to coherent memory. The prefetch engine does so by performing a non-binding prefetch of data associated with transactions in the I/O transaction request buffer(s) 210 and then storing the prefetched data in the I/O cache buffer(s) 205. This prefetching of data may be performed while another transaction is being processed or while awaiting a response for a previous prefetch operation. Further, the prefetch engine 215 may prefetch data associated with any coherent transaction request in the I/O transaction request buffer, regardless of the order in which it was received. In this manner, pipelining is enabled. The operation of the prefetch engine 215 of one embodiment is described in more detail in reference to FIGS. 2 and 3.

Figure 3:
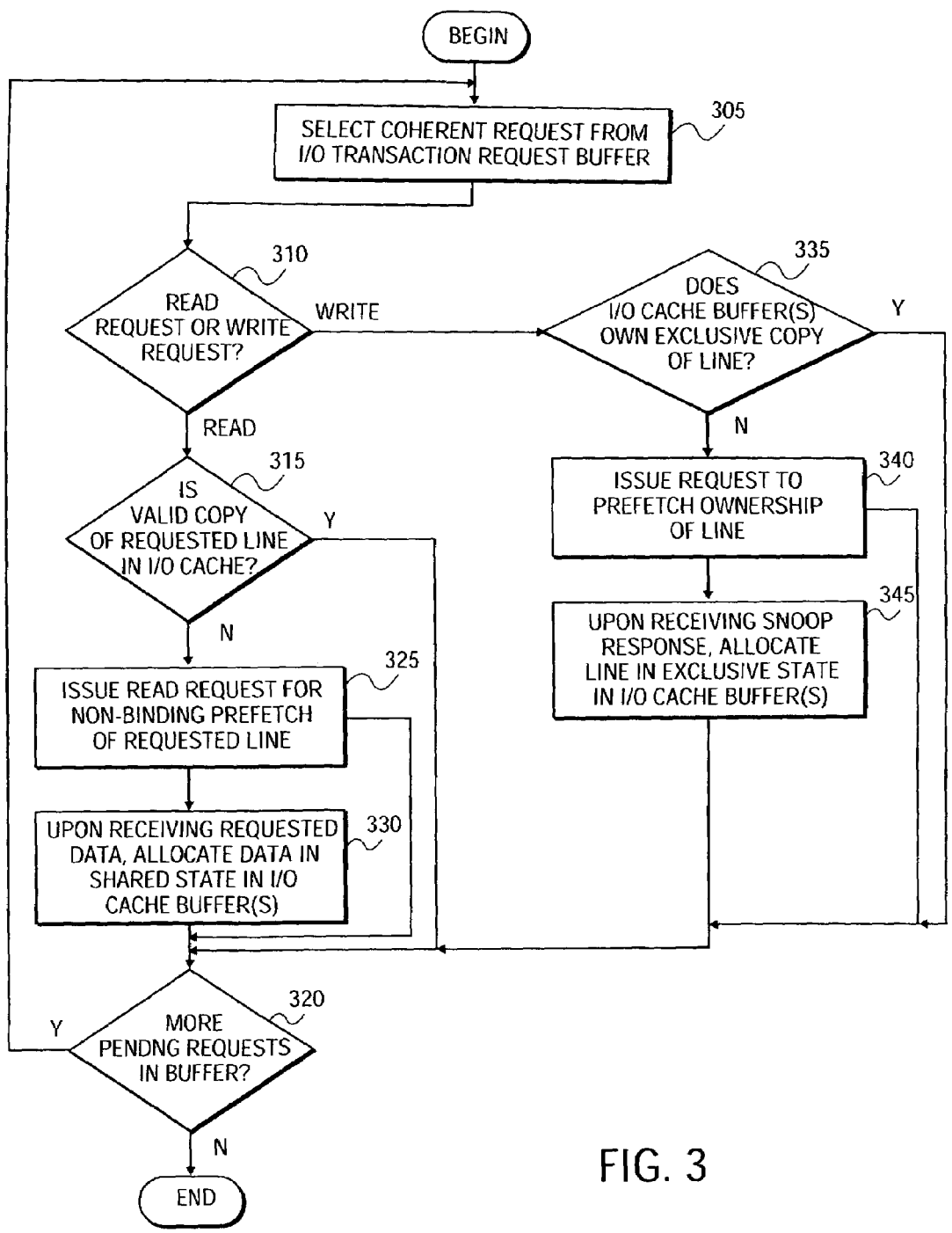
FIG. 3 is a flow diagram illustrating the operation of the prefetch engine of FIG. 2.

As shown at block 305 of FIG. 3, the prefetch engine 215 first selects a coherent request from the I/O transaction request buffer(s) 210. Any one of a number of approaches may be used to select the pending coherent request that is operated on by the prefetch engine 215. For example, the prefetch engine 215 may simply select the next pending request in the buffer(s) 210. If there are multiple I/O transaction request buffers, the prefetch engine 215 may use a timeslicing approach, for example, to select the next pending coherent request in one of the buffers. Alternatively, the selection by the prefetch engine of the next pending coherent request on which to operate may be arbitrary. No matter what approach is used, however, the prefetch engine 215 does not need to observe ordering requirements in selecting pending requests or in performing prefetch operations.

Further, for one embodiment, if, for example, the prefetch engine 215 is otherwise idle (e.g. there are no pending transaction requests in the I/O transaction request buffer(s)

210), the prefetch engine 215 may speculatively prefetch data. For this embodiment, the prefetch engine 215 may use any one of a number of approaches to determine data to be speculatively prefetched for an anticipated I/O transaction. For example, the prefetch engine 215 may prefetch the next memory line or lines following the data that was just prefetched. In this manner, if an upcoming inbound I/O transaction request indicates data sequentially following the previous request, the data will be immediately available. Other approaches to determining data to speculatively prefetch are within the scope of various embodiments.

At decision block 310, it is determined whether the selected coherent request is a read request or a write request. If, for example, the prefetch engine 215 is operating on a pending read request, then at block 315, the prefetch engine 215 determines whether a valid copy of the requested memory line is available in the I/O cache buffer(s) 205. If so, the prefetch engine continues at block 320 to determine whether there are more pending requests in the I/O transaction request buffer(s) 210 and may continue at block 305 to prefetch data associated with other pending requests in the I/O transaction request buffer(s) 210.

At decision block 315, if a valid copy of the requested memory line is not available in the local I/O cache buffer(s) 205, then, at block 325, the prefetch engine 215 issues a read request over the coherent system interconnect 270 to prefetch the requested line of memory to be read. Where the I/O bridge 250 is included in a system similar to the system 100 of FIG. 1, the read request issued over the coherent system interconnect 270 is communicated through the interconnection network, over coherent system interconnect buses coupled to the various system processing nodes to the distributed, coherent memories of the system. Where the system that includes the I/O bridge 250 is configured in a different manner, the read request issued over the coherent system interconnect may reach the distributed, coherent memory in via a different route.

This prefetch operation, as well as other prefetch operations performed by the prefetch engine 215 of one embodiment, is a non-binding prefetch operation. Non-binding in this context means that, if an incoming snoop request is received over the coherent system interconnect 270 from some other memory/caching agent in the system, and this snoop request hits a line in the I/O cache buffer(s) 205, the memory/cache coherence protocol for the distributed, coherent memory (the MESI protocol for one embodiment) is followed. Thus, between the prefetch operation and retirement of the corresponding transaction request, the prefetched memory line stored in the I/O cache buffer(s) 205 may be invalidated and/or the I/O cache buffer(s) 205 may lose ownership of the line. The manner in which this issue is addressed is discussed in more detail below in reference to the operation of the retirement engine 220.

With continuing reference to FIGS. 2 and 3, while awaiting a response from the coherent system interconnect, the prefetch engine 215 may proceed at block 320 to determine whether there are more pending requests in the I/O transaction request buffer(s) 210 or whether to speculatively prefetch additional data. The prefetch engine can then continue to prefetch data in response to other pending requests in the I/O transaction request buffer(s) 210 or speculatively prefetch data in the manner described above.

At block 330, upon receiving the requested data over the coherent system interconnect 170, the prefetch engine 215 allocates this data in a shared state in the I/O cache buffer(s) 205. This is done by indicating the memory address associated with the data in the address field of the I/O cache buffer(s) 205, the requested data in the corresponding data field, and the cache coherency state (shared in this case) in the corresponding state field.

Referring back to decision block 310, if the selected request is instead a write request, then at block 335, the prefetch engine 215 determines whether the I/O cache buffer(s) 205 own an exclusive copy of the memory line corresponding to the write request. (Using the MESI protocol, for example, this ownership is indicated by either an E or M state). If so, then at block 320, as previously described, the prefetch engine 215 may continue to prefetch data corresponding to other pending requests or speculatively prefetch data as described above.

If, at decision block 335, the I/O cache buffer(s) 205 does not own an exclusive copy of the particular memory line associated with the write request, then at block 340, the prefetch engine 215 issues a request to prefetch ownership of the memory line over the coherent system interconnect 270. For one embodiment, the form of the request may differ depending on whether the write request is a partial-line write request or a full-line write request. For example, for a full-line write request, the prefetch engine may issue an invalidation request to invalidate other copies of the memory line without reading the contents of the memory line while, for a partial-line write request, the prefetch engine may issue a read request for ownership which invalidates other copies of the memory line and returns the contents of the memory line.

Similar to the read requests, while waiting for the snoop response over the interconnect 270, the prefetch engine 215 may continue to prefetch data associated with other pending I/O transaction requests.

At block 345, upon receiving a snoop response, the prefetch engine allocates the requested memory line in an exclusive state (i.e. the "E" state according to the MESI protocol, for example) in the I/O cache buffer(s) 205. The method of one embodiment then continues at block 320 to determine whether there are more pending I/O requests to be operated upon.

In parallel with the above actions by the prefetch engine 215, the retire engine 220 operates to retire I/O transaction requests from the I/O transaction request buffer(s) 210 in order once they have been completed. The operation of the retire engine 215 of one embodiment is described with reference to FIGS. 2 and 4.

At block 405, the retire engine 220 selects the next transaction, in order, to retire from the I/O transaction request buffer(s) 210. For one embodiment, the retire engine 220 may retire transaction requests strictly in the order in which they were received from a particular I/O bus. For another embodiment, the retire engine 220 may retire transaction requests according to specific ordering rules that may provide for variations from the order in which the transactions are received. For one embodiment, these ordering requirements may be specified in the transactions themselves and then processed according to a state machine, for example, in the retire engine 220.

For example, for one embodiment, a read transaction request with corresponding data available in the I/O cache buffer(s) 205 may be retired before an earlier received, read transaction request, such that a subsequent read request effectively passes an uncompleted, prior read request. For this same embodiment, however, a read request may not be retired before an earlier received write request. Other types of ordering rules may be imposed upon the retire engine to ensure that erroneous data is not written to or read from any memory in the system. The order in which instructions are retired to prevent erroneous read or write transactions is referred to herein as program order.

Further, as described above, for one embodiment, the I/O transaction request buffer(s) 210 may also store non-coherent I/O transaction requests. For such an embodiment, the retirement order maintained by the retire engine 220 also includes retiring the non-coherent I/O transaction requests in order.

At block 410, once the I/O transaction request to be retired has been selected, the retire engine 220 determines at block 415 whether the transaction is a read transaction or a write transaction. If the transaction is a read transaction, then at block 420, the retire engine 220 determines whether the memory line associated with the transaction is present and valid in the I/O cache buffer(s) 205. If so, then at block 425, the corresponding data from the I/O cache buffer(s) 205 is returned to the requesting I/O agent over the corresponding one of the I/O buses 255.

If, at decision block 420, it is determined that the corresponding memory line is either not present in the I/O cache buffer(s) 205 or is invalid (possibly due to a snoop request by another caching agent in the system as described above), then at block 440, the retire engine issues a read request over the coherent system interconnect 270 to fetch the memory line corresponding to the transaction request. Once the requested data has been returned to the I/O bridge 250 over the coherent system interconnect 270, the data is provided to the requesting I/O agent at block 425.

At block 430, once the I/O transaction request has been serviced, it is removed from the I/O transaction request buffer(s) 210. This may be accomplished in any one of a number of ways. For one embodiment, for example, the entry in the I/O transaction request buffer(s) 210 is erased. For another embodiment, the line in the buffer(s) 210 may merely be made available to a subsequent entry through the use of a flag or another approach such that it is overwritten.

Referring back to decision block 415, if the I/O transaction request to be retired is, instead, a write request, then at decision block 445, it is determined whether the I/O cache buffer(s) 205 own the corresponding memory line in an exclusive state (i.e. either an M or an E state in accordance with the MESI protocol). As described above, even if ownership of the memory line was previously prefetched, the I/O cache buffer(s) 205 may have lost ownership of the line between the time the memory line was prefetched and the time the transaction request is to be retired. This may be due, for example, to an intermediate snoop operation from another caching agent in the system hitting the requested cache line in the I/O cache buffer(s) 205.

If the I/O cache buffer(s) 205 own the memory line in an exclusive state, then at block 450, the data associated with the memory line is updated in the I/O cache buffer(s) 205 according to the write request and the state of the line is marked as modified. (The data to be written to the memory line according the write request may have been temporarily stored in a write buffer (not shown), for example, prior to writing to the memory line in the I/O cache buffer(s) 205).

If the write request is a full-line write request, the entire line of data is simply written to the data field of the corresponding entry in the I/O cache buffer(s) 205 according to the write request. If, instead, the write request is a partial-line write request, the data to be written may be merged with data presently in the corresponding line of the I/O cache buffer(s) 205 in a manner well-known to those of ordinary skill in the art.

For one embodiment, to allow for better tracking of the I/O cache buffer(s) 205 state, if a modified line in the I/O cache buffer(s) 205 is replaced as new entries are added in response to any fetch, prefetch or acquisition of ownership operation, for example, the I/O bridge 250 sends a request over the coherent system interconnect 270 to appropriately update the line in the distributed memory. If a clean line (i.e. no data is currently stored in that cache line) in the I/O cache buffer(s) 205 is replaced in response to a prefetch operation, for example, the I/O bridge 250 sends a snoop request over the coherent system interconnect 270 to indicate this action to the entity tracking the state of the cache buffers in the system. These snoop requests may be sent, for example, by other coherency control logic included within the I/O bridge (not shown). This other coherency control logic may also perform functions such as snoops in response to other types of actions and/or interpreting the coherency state(s) associated with the I/O cache buffer(s) 205 and/or other caching agents in the system.

Figure 4:
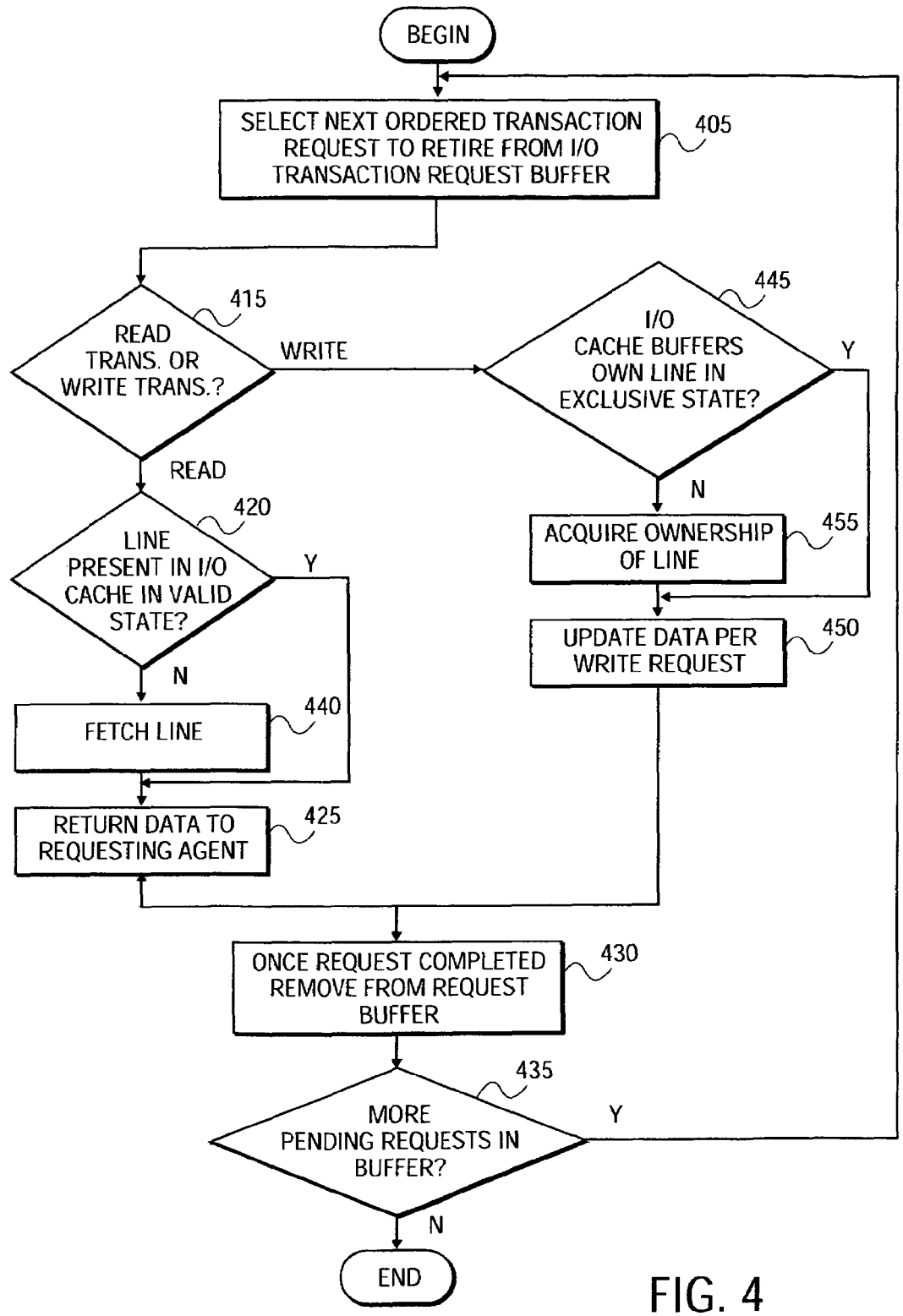
FIG. 4 is a flow diagram illustrating the operation of the retire engine of FIG. 2.

With continuing reference to FIGS. 2 and 4, at decision block 445, if the I/O cache buffer(s) 205 do not own the memory line corresponding to the write request in an exclusive state, then at block 455, the retire engine 220 requests and acquires ownership of the memory line over the coherent system interconnect in a similar manner to the above-described corresponding prefetch operation. The retire engine then continues at block 450 to update data in the cache buffer(s) 205 per the write request being retired as also described above.

At block 430 once the request has been completed, the request is removed from the I/O transaction request buffer 210.

At decision block 435, it is determined whether there are more pending requests in the I/O transaction request buffer 210. If so, they are processed and retired in a similar manner.

Using the above-described approach, it is possible to pipeline ordered I/O transaction requests in a system in which there are multiple paths between an I/O bus and memory (as in, for example, a system with distributed, coherent memory). This pipelining is partially facilitated by a prefetch engine that performs non-binding, unordered prefetch operations in response to coherent memory access requests from one or more I/O buses. Additionally, the above-described local I/O cache buffer(s) assists in the pipelining operations by storing the results of the prefetch operations, while maintaining coherency with the remainder of the distributed memory subsystem and cache memories. Enabling pipelining of I/O requests may improve I/O throughput, and thus, overall system performance as compared to prior approaches for handling I/O transactions in a multi-processor, distributed memory, cache coherent system.

Figure 5:
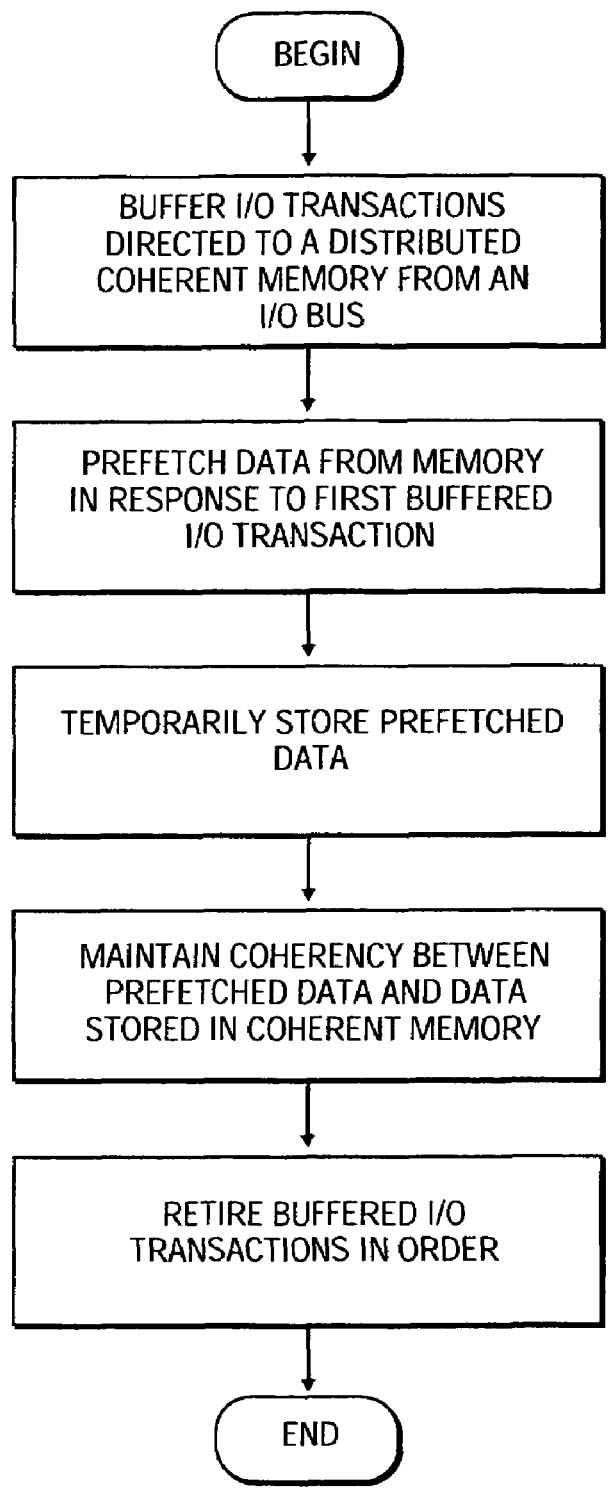
FIG. 5 is a flow diagram illustrating a method of one embodiment for pipelining ordered I/O transactions.

FIG. 5 is a flow diagram illustrating a method of one embodiment for pipelining ordered I/O transactions. At block 505, I/O transactions directed to a distributed coherent memory from an I/O bus are buffered. At block 510, data is prefetched from the distributed, coherent memory in response to a first buffered input/output transaction and temporarily stored at block 515. At block 520, coherency is maintained between the prefetched data and data stored in the distributed, coherent memory and other cache memories and at block 525, the buffered I/O transactions are retired in order. It will be appreciated that, for other embodiments, the method may include only some of the actions described above or may include additional actions not described above. Further, one or more of the actions may be performed in a different order than described above or concurrently with another action described above.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
    a prefetch engine to prefetch data from a distributed, coherent memory in response to a first transaction from an input/output bus directed to the distributed, coherent memory; and
    an input/output coherent cache buffer to receive the prefetched data, the coherent cache buffer being coherent with the distributed, coherent memory and with other cache memories in a system including the input/output coherent cache buffer,
    the prefetch engine further to speculatively prefetch data in anticipation of a need for the speculatively prefetched data in association with a second input/output transaction only if data has been prefetched for all pending, memory-related transactions from the input/output bus.

2. The apparatus of claim 1 wherein the prefetch operation performed by the prefetch engine is a non-binding prefetch operation such that the prefetched data received by the coherent cache buffer may be altered by a memory in the distributed coherent memory.

3. The apparatus of claim 2 wherein the first transaction request is a memory read request and the prefetch engine issues a read request to prefetch data to be read from the distributed, coherent memory in response to the first transaction request.

4. The apparatus of claim 2 wherein the first transaction request is a memory write request and the prefetch engine issues a request to prefetch ownership of a memory line in the distributed, coherent memory, the memory line being indicated by the first transaction request.

5. The apparatus of claim 1 further comprising:
    an input/output transaction request buffer to temporarily store transaction requests received from the input/output bus directed to the distributed, coherent memory.

6. The apparatus of claim 5 wherein
    the prefetch engine prefetches data in response to transaction requests stored in the input/output transaction request buffer.

7. The apparatus of claim 6 wherein
    the prefetch engine prefetches data in response to transaction requests stored in the input/output transaction request buffer regardless of the order in which the transaction requests were received from the input/output bus.

8. The apparatus of claim 5 further comprising:
    a retire engine to retire input/output transaction requests stored in the transaction request buffer in program order after the transaction requests have been completed.

9. The apparatus of claim 8 wherein
    the retire engine is further to check the input/output coherent cache buffer to determine whether data associated with an input/output transaction request to be retired is present in the input/output coherent cache buffer in a valid state.

10. The apparatus of claim 1 wherein
    coherency is maintained between the input/output coherent cache buffer and the distributed, coherent memory using a MESI protocol.

11. A method comprising:
    prefetching data in response to a first input/output transaction request received from an input/output bus and directed to a distributed, coherent memory;
    only if data has been prefetched for all pending memory-related input/output transactions, speculatively prefetching data in anticipation of a need for the speculatively prefetched data in association with a second input/output transaction;
    temporarily storing the prefetched data; and
    maintaining coherency between the prefetched data and data stored in the distributed, coherent memory and data stored in other cache memories.

12. The method of claim 11 further comprising:
    buffering input/output transaction requests received from the input/output bus that are directed to the distributed, coherent memory.

13. The method of claim 12 further comprising:
    prefetching data in response to third and fourth buffered input/output transactions wherein
    prefetching data in response to the first, third and fourth buffered input/output transactions may be performed in any order.

14. The method of claim 12 further comprising;
    retiring the buffered input/output transactions in the order in which they were issued by the input/output bus.

15. The method of claim 14 wherein retiring includes
    checking the temporarily stored, prefetched data to determine whether valid data corresponding to the transaction request to be retired is temporarily stored.

16. The method of claim 11 wherein
    maintaining coherency includes maintaining coherency using a MESI protocol.

17. The method of claim 11 wherein prefetching includes
    issuing a request for the data in response to the first transaction request; and
    receiving the requested data.

18. The method of claim 17 wherein
    prefetching data in response to a third input/output transaction request received from the input/output bus and directed to the distributed, coherent memory occurs between issuing the request and receiving the requested data.

19. A computer system comprising:
    first and second processing nodes each including at least one processor and at least one caching agent;
    a distributed coherent memory wherein portions of the distributed coherent memory are included within each of the first and second processing nodes; and
    an input/output node coupled to the first and second processing nodes, the input/output node comprising
        a prefetch engine to prefetch data from the distributed, coherent memory in response to a first transaction from a first input/output bus directed to the distributed, coherent memory and to speculatively prefetch data after only data has been prefetched for all pending memory-related transactions from the input/ output bus in anticipation of a need for the speculatively prefetched data in association with a second input/output transaction; and an input/output coherent cache buffer to receive the prefetched data, the coherent cache buffer being coherent with the distributed, coherent memory and the caching agents.

20. The computer system of claim 19 further comprising:
a coherent system interconnect to couple each of the first and second processing nodes to the input/output node, the coherent system interconnect to communicate information to maintain coherency of the distributed, coherent memory and to maintain coherency between the input/output coherent cache buffer and the distributed, coherent memory.

21. The computer system of claim 20 wherein coherency is maintained in accordance with a MESI protocol.

22. The computer system of claim 19 further comprising an interconnection network to communicate information between the first and second processing nodes and the input/output node.

23. The computer system of claim 19 further comprising an input/output bridge coupled between the first and second processing nodes and a plurality of input/output buses, the plurality of input/output buses including the first input/output bus, the input/output bridge including the prefetch engine and the input/output coherent cache buffer.

24. The computer system of claim 23 wherein the input/output bridge further comprises:
at least one input/output transaction request buffer to temporarily store input/output transaction requests received from the plurality of input/output buses that are directed to the distributed, coherent memory.

25. The computer system of claim 24 wherein
the prefetch engine prefetches data in response to transaction requests stored in the input/output transaction request buffer regardless of the order in which the transaction requests are stored.

26. The computer system of claim 24 wherein the input/output bridge further comprises
a retire engine further to check the input/output coherent cache buffer for valid data corresponding to a transaction request to be retired,
the retire engine to retire transaction requests stored in the input/output transaction request buffer in program order.

* * * * *